(12) United States Patent
Bamford, Jr. et al.

(10) Patent No.: US 10,994,449 B2
(45) Date of Patent: May 4, 2021

(54) AIR IMPINGEMENT DEVICE, SYSTEM AND METHOD FOR THERMAL PROCESSING AND CONSOLIDATION

(71) Applicant: LIGHTWEIGHT LABS, LLC, Tacoma, WA (US)

(72) Inventors: Calvin D. Bamford, Jr., Tacoma, WA (US); Ronald M. Jacobsen, Puyallup, WA (US); James P. Martin, Troy, NY (US)

(73) Assignee: LIGHTWEIGHT LABS, LLC, Tacoma, WA (US)

( * ) Notice: Subject to any disclaimer, the term of this patent is extended or adjusted under 35 U.S.C. 154(b) by 378 days.

(21) Appl. No.: 15/653,482

(22) Filed: Jul. 18, 2017

(65) Prior Publication Data

US 2018/0229403 A1     Aug. 16, 2018

Related U.S. Application Data (63) Continuation of application No. 15/431,611, filed on Feb. 13, 2017, now abandoned.

(51) Int. Cl.
*B29C 35/04* (2006.01)
*B29C 35/16* (2006.01)
(Continued)

(52) U.S. Cl.
CPC ............ *B29C 35/045* (2013.01); *B29C 35/16* (2013.01); *B29C 70/30* (2013.01); *B29C 70/44* (2013.01);
(Continued)

(58) Field of Classification Search
CPC ........ B29C 35/045; B29C 35/16; B29C 35/04
(Continued)

(56) References Cited

U.S. PATENT DOCUMENTS

| 4,154,861 A | * | 5/1979 | Smith | A21B 1/245 |
| | | | | 126/21 A |
| 4,873,107 A | * | 10/1989 | Archer | A21B 1/245 |
| | | | | 426/520 |

(Continued)

FOREIGN PATENT DOCUMENTS

| EP | 0473422 A1 | * | 3/1992 | .......... B29C 70/345 |
| EP | 0473422 A1 | | 3/1992 | |
| WO | 2008094124 A1 | | 8/2008 | |

OTHER PUBLICATIONS

International Search Report dated Oct. 13, 2015 in International Application No. PCT/US2015/038371, filed Jun. 29, 2015, 6pp.

(Continued)

*Primary Examiner* — Timothy Kennedy
*Assistant Examiner* — Farah Taufiq
(74) *Attorney, Agent, or Firm* — Hauptman Ham, LLP (57) ABSTRACT

A thermal processing and consolidation system includes an upper assembly, a lower assembly, and an air impingement device. At least one of the upper assembly or the lower assembly is a chamber assembly. The upper assembly and the lower assembly are movable relative to one another between an opened position where the upper assembly and the lower assembly are detached from one another, and a closed position where the upper assembly and the lower assembly are coupled to one another and form an enclosed plenum for receiving a tool. The air impingement device is arranged at least partially in the plenum, and configured to direct forced flows of air at the tool when the tool is received in the plenum.

20 Claims, 7 Drawing Sheets

(51) Int. Cl.
*B29C 70/30* (2006.01)
*B29C 70/44* (2006.01)

(52) U.S. Cl.
CPC ............................ *B29C 2035/046* (2013.01);
*B29C 2035/1666* (2013.01)

(58) Field of Classification Search
USPC ...................................................... 425/73, 74
See application file for complete search history.

(56) References Cited

U.S. PATENT DOCUMENTS

| | | |
|---|---|---|
| 5,139,407 A | 8/1992 | Kim et al. |
| 6,015,512 A | 1/2000 | Yang et al. |
| 6,171,419 B1 | 1/2001 | Heiman et al. |
| 6,872,918 B2 * | 3/2005 | Toll .............................. B01J 3/04 165/64 |
| 8,235,170 B1 * | 8/2012 | Ertz ....................... F01D 25/305 181/213 |
| 8,650,745 B2 * | 2/2014 | Jacobsen .................. B29C 35/02 264/101 |
| 2008/0070493 A1 * | 3/2008 | Rimmer ................. F24F 1/0007 454/186 |
| 2012/0003597 A1 | 1/2012 | Mason |
| 2014/0231671 A1 * | 8/2014 | Lu .......................... B05D 3/067 250/455.11 |
| 2015/0375444 A1 | 12/2015 | Bamford et al. |

OTHER PUBLICATIONS

Written Opinion dated Oct. 13, 2015 in International Application No. PCT/US2015/038371, filed Jun. 29, 2015, 5pp.

* cited by examiner

AIR IMPINGEMENT DEVICE, SYSTEM AND METHOD FOR THERMAL PROCESSING AND CONSOLIDATION

CROSS-REFERENCE

The instant application is a continuation of U.S. application Ser. No. 15/431,611 filed Feb. 13, 2017, which claims priority to U.S. Provisional Patent Application No. 62/294,976, filed Feb. 12, 2016, the contents of both applications being hereby incorporated herein by reference in its entirety. The instant application is related to U.S. Pat. No. 8,650,745, entitled "THERMAL PROCESSING AND CONSOLIDATION SYSTEM AND METHOD," which is incorporated by reference in its entirety herein. The instant application is also related to U.S. patent application Ser. No. 14/754,086, filed Jun. 29, 2015, entitled "SLIPPER TOOL, SYSTEM AND METHOD FOR USING THE SLIPPER TOOL FOR MOLDING," which is incorporated by reference in its entirety herein.

TECHNICAL FIELD

The disclosure is related to air impingement device and method for a thermal processing and consolidation system.

BRIEF DESCRIPTION OF THE DRAWING

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

In this disclosure, "air" means not only the air in the atmosphere, but also any gas or mixture of gases that can be pressurized and heated to pressures and temperatures sufficient for thermal processing and consolidation of curable and formable materials including, but not limited to, composite materials as described in U.S. Pat. No. 8,650,745. Examples of curable materials include, but are not limited to, thermosetting composite materials. Examples of formable materials include, but are not limited to, thermoplastic composite materials.

In one or more embodiments, for improving the heating rate and/or heating uniformity of curable and formable materials being thermally processed and consolidated inside a plenum of a thermal processing and consolidation system, such as a system described in U.S. Pat. No. 8,650,745, an air impingement device is provided at least partially in the plenum, and configured to direct forced flows of air at the materials being thermally processed and consolidated. In at least one embodiment, the air impingement device is further configured to cool the materials after the materials have been heated.

Figure 1:
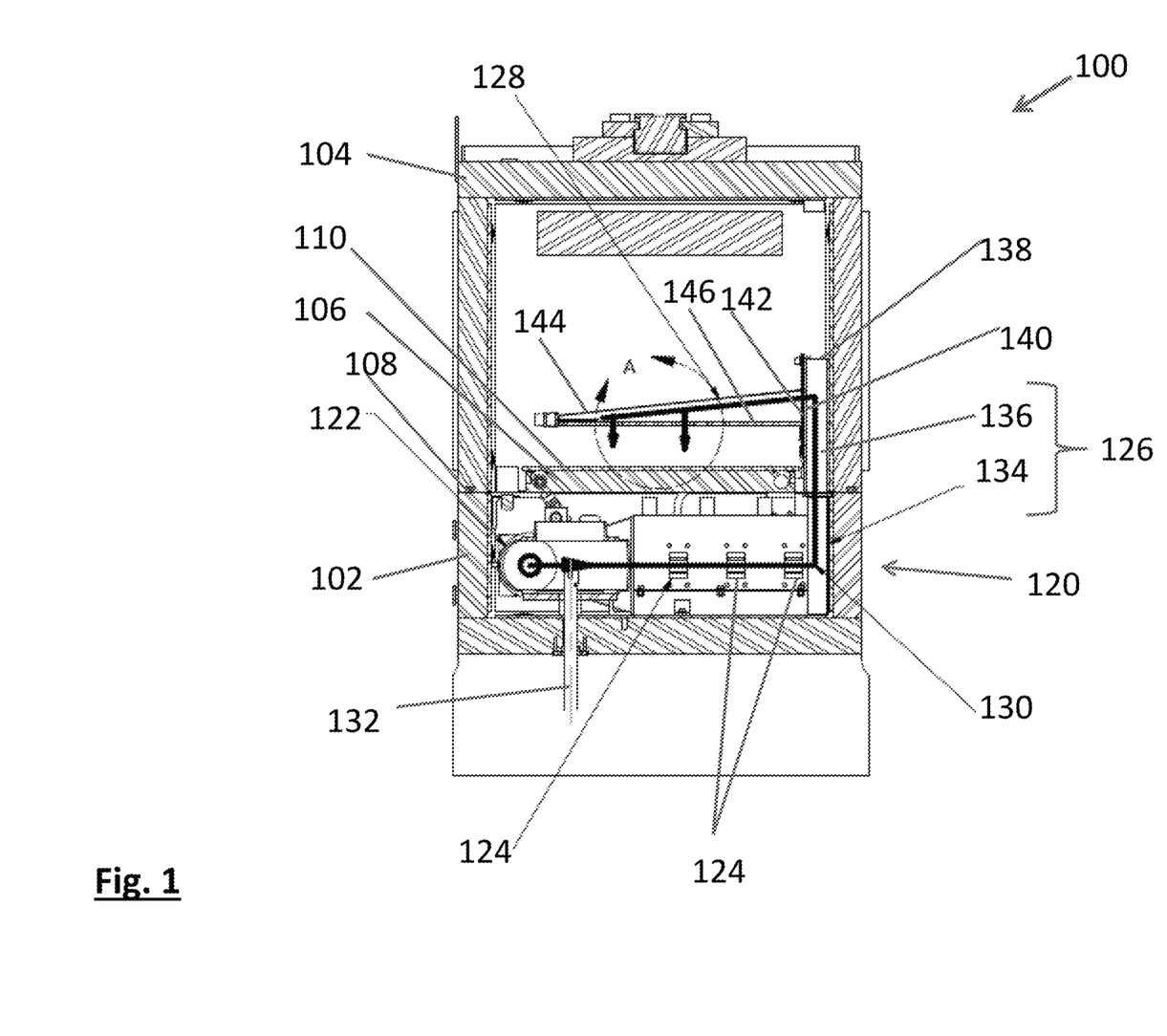
FIG. 1 is a schematic cross-section view of a thermal processing and consolidation system incorporating an air impingement device in accordance with some embodiments.

FIG. 1 is a schematic view of a thermal processing and consolidation system 100 incorporating an air impingement device in accordance with some embodiments. One or more examples of the thermal processing and consolidation system 100 is described in U.S. Pat. No. 8,650,745. Specifically, the thermal processing and consolidation system 100 comprises a lower assembly 102, an upper assembly 104, a tool 106, and a seal 108. At least one of the upper assembly 104 or the lower assembly 102 is a chamber assembly in some embodiments. In the example configuration in FIG. 1, the upper assembly 104 is a chamber assembly. The upper assembly 104 is moveable relative to the lower assembly 102. In a closed state or position as shown in FIG. 1 and also described herein with respect to FIG. 4, the lower assembly 102 and the upper assembly 104 join together to create a plenum which is sealed by the seal 108 between the lower assembly 102 and the upper assembly 104. The closed plenum encloses the tool 106 containing therein a material, e.g., a set of components 110, to be thermally processed and consolidated. The environment inside the plenum is pressurized by a pressurized air source (for example, as described herein with respect to FIG. 4), and the tool 106 is heated (for example, as described herein with respect to FIG. 4), thereby heating the set of components 110 from below for thermally processing and consolidating, e.g., curing or forming, the set of components 110 laid-up on the tool 106. After thermally processing and consolidating, the plenum is depressurized and then opened. In an opened state or position (for example, as described herein with respect to FIG. 5), the upper assembly 104 is detached from and moved away from the lower assembly 102 to open the plenum to permit the tool 106 and the processed and consolidated set of components 110 to be removed from the plenum. The same tool 106, or a different tool, with a new set of unprocessed components 110 is then placed in the plenum, and the cycle repeats. Further details on configuration and/or operation of thermal processing and consolidation system 100 are included in U.S. Pat. No. 8,650,745. As used herein, "tool" or "tool 106" refers to the tool described in U.S. Pat. No. 8,650,745, and/or the slipper tool described in U.S. patent application Ser. No. 14/754,086.

In one or more embodiments, for improving the heating rate and/or heating uniformity of the set of components 110 being thermally processed and consolidated inside the plenum, an air impingement device 120 is included in the thermal processing and consolidation system 100 and configured to generate forced flows or jets of heated air impinging upon the set of components 110 from above. In some embodiments, the air impingement device 120 is further configured to cool the set of components 110 after the set of components 110 has been heated, as described herein.

The air impingement device 120 in accordance with some embodiments comprises a blower 122, one or more heaters 124, ducting 126, and a diffuser 128. The described configuration and components are examples. Other arrangements are within the scopes of various embodiments. For example, any air handler or air moving equipment is usable as the blower 122 in one or more embodiments. In the specific embodiment disclosed in FIG. 1, the heaters 124 are indicated as resistive heaters. However, other types of heaters, such as gas heaters, infrared heaters, or the like, are usable in one or more embodiments. In one or more embodiments, the ducting 126 is omitted or has a different configuration than as disclosed in FIG. 1 and described in detail below. Likewise, in one or more embodiments, the diffuser 128 has a different configuration than as disclosed in FIG. 1 and described in detail below.

Figure 4:
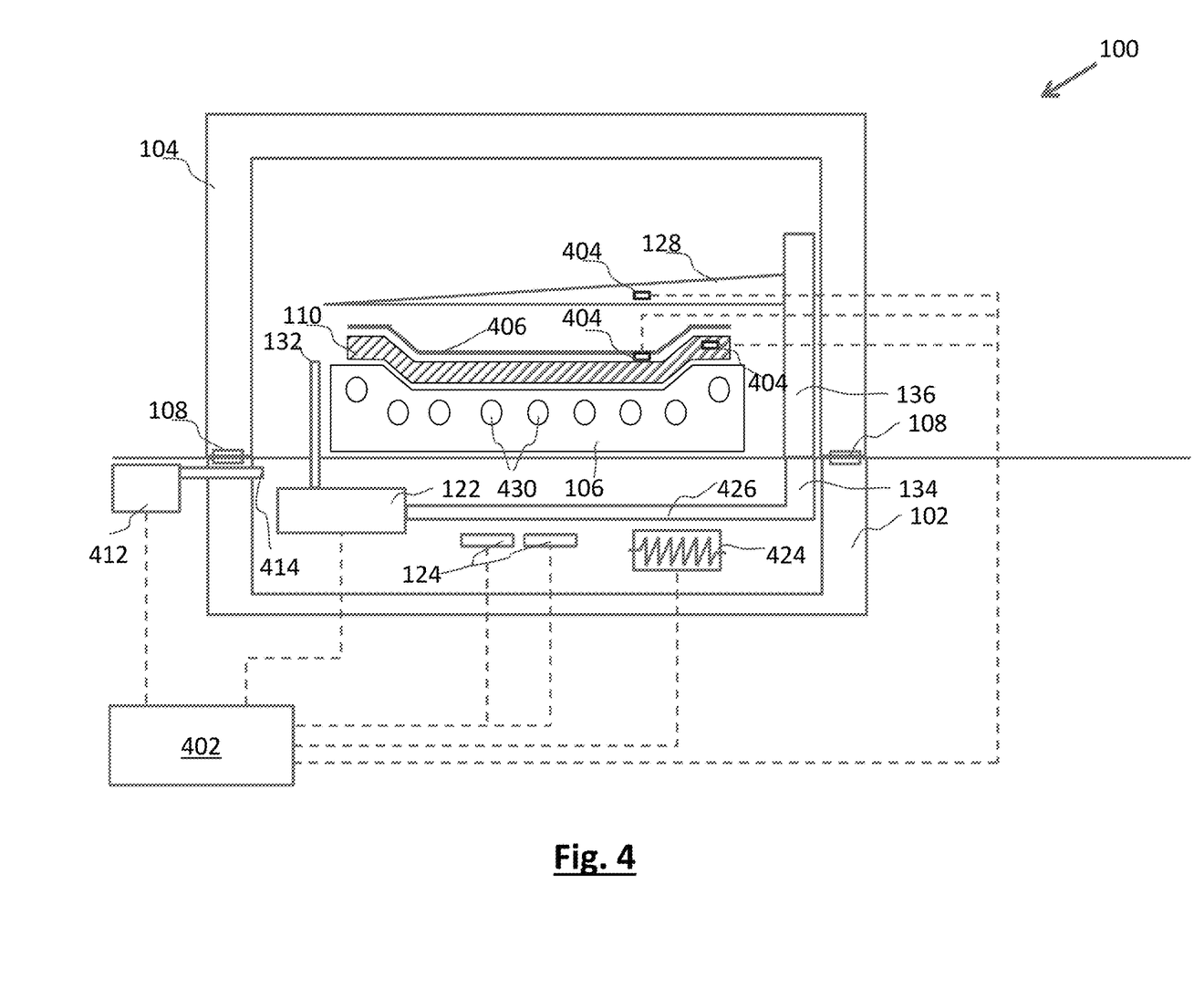
FIG. 4 is a schematic cross-section view similar to FIG. 1, and showing further elements in a closed state of the thermal processing and consolidation system incorporating an air impingement device in accordance with some embodiments.

The blower 122 is arranged in the lower assembly 102, and configured to cause air inside the closed plenum to circulate through an air flow path 130. Specifically, the blower 122 has an air intake 132 which has an open end (not shown in FIG. 1) opening to an interior of the closed plenum. In one or more embodiments, the open end of the air intake 132 is arranged adjacent the upper surface of the tool 106 or the set of components 110 (for example, as shown in FIG. 4). Other arrangements are within the scopes of various embodiments. The blower 122 forces the air taken from inside the plenum via the air intake 132 to form a forced air flow, from an outlet of the blower 122, through the heaters 124 which heat up the air, then through the ducting 126, and to the diffuser 128 which diffuses the heated forced air flow into a plurality of forced flows or jets of heated air impinging upon the set of components 110 from above, as described herein below.

The heaters 124 are arranged in the lower assembly 102. Other configurations are within the scopes of various embodiments. For example, in some embodiments, the blower 122 and/or one or more of the heaters 124 is/are arranged outside the lower assembly 102 and/or the plenum, and is/are connected with piping to the air flow path 130 inside the plenum.

The ducting 126 includes two detachably connectable parts, i.e., a lower duct 134 arranged in the lower assembly 102, and an upper duct 136 arranged in the upper assembly 104. In the opened state when the upper assembly 104 is moved away from the lower assembly 102, the upper duct 136 is disconnected and moved away from the lower duct 134. In the closed state when the upper assembly 104 is sealingly joined with the lower assembly 102 to close the plenum, the lower duct 134 is automatically connected and sealed with the upper duct 136 by movement of the upper assembly 104 toward the lower assembly 102. In one or more embodiments, a seal (not shown) is provided to seal the lower duct 134 with the upper duct 136 in the closed state. The upper duct 136 has a closed top wall 138, and an opening or window 140 on a side facing the diffuser 128.

The diffuser 128 is arranged in the upper assembly 104 and is coupled to the upper duct 136 to receive the heated air flow. The diffuser 128 comprises an opening or window 142 on a side facing the upper duct 136. The window 142 of the diffuser 128 is in fluid communication with the window 140 of the upper duct 136. The diffuser 128 further comprises a closed top wall 144 and a perforated bottom wall 146. The top wall 144 is inclined relative to the air flow coming into the diffuser 128 from the upper duct 136 via the windows 140, 142, and deflects the air flow toward the bottom wall 146. The bottom wall 146 includes a plurality of exit holes 148 (best seen in FIGS. 2 and 3) through which the deflected, heated air are forced out as jets impinging on the set of components 110, as shown by the arrows at the end of the air flow path 130.

Figures 2, 3:
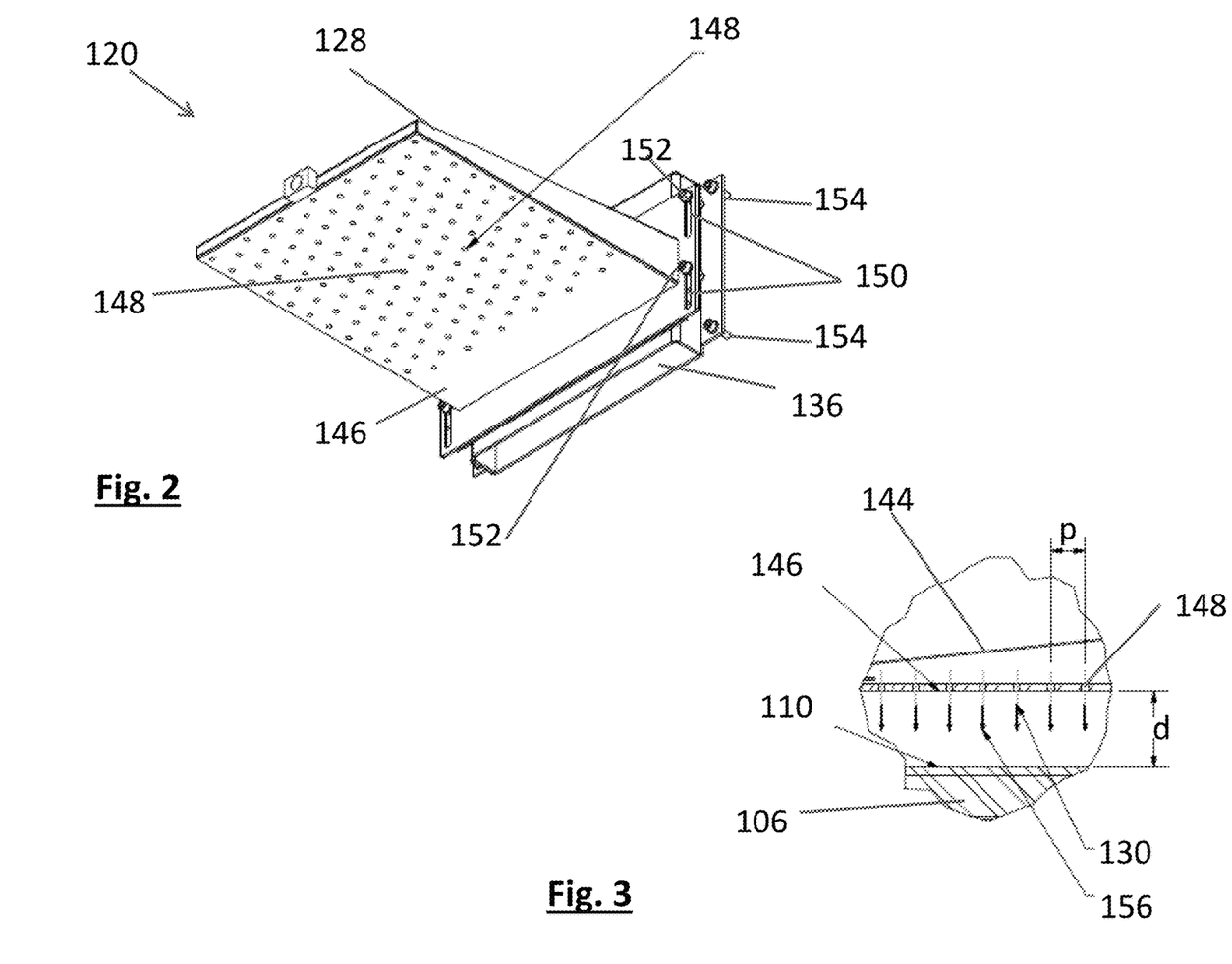
FIG. 2 is a bottom, perspective view of an air impingement device in accordance with some embodiments.
FIG. 3 is an enlarged view of region A in FIG. 1.

FIG. 2 is a bottom, perspective view of the air impingement device 120 in accordance with some embodiments. The diffuser 128 is adjustably attached to the upper duct 136 at different heights to arrange the exist holes 148 at different distances from the set of components 110. For example, in the specific configuration in FIG. 2, elongated slots 150 are formed on the side of the diffuser 128 that faces the upper duct 136, and bolts 152 extend through the elongated slots 150 and corresponding holes (not shown) in the upper duct 136 to fix the diffuser 128 to the upper duct 136. Bolts 154 are used to fix the upper duct 136 to an inner wall of the upper assembly 104. By sliding the diffuser 128 up and down along the elongated slots 150, the distance d (FIG. 3) between the exit holes 148 of the diffuser 128 and the set of components 110 on the tool 106 is adjustable. In some embodiments, the window 140 (FIG. 1) of the upper duct 136 is larger than the window 142 (FIG. 1) of the diffuser 128. This arrangement, in conjunction with the adjustable coupling between the diffuser 128 and the upper duct 136, permits the distance d between the diffuser 128 and the set of components 110 to be adjusted without affecting fluid communication between the diffuser 128 and the upper duct 136. The described configuration is an example. Other arrangements are within the scopes of various embodiments. For example, other adjustable couplings are usable for attaching the diffuser 128 to the upper duct 136 in one or more embodiments. Further, although manual adjustment of the distance d is described with the use of the elongated slots 150 and the bolts 152, other adjustment mechanisms, e.g., with the use of a motor or an air cylinder, are within the scopes of various embodiments.

FIG. 3 is an enlarged view of region A in FIG. 1. The specific configuration disclosed in FIG. 3, with the distanced between the exit holes 148 and the set of components 110 being ⅞ in and a pitch p between adjacent exit holes 148 being 1.25 in is an example. Other distance and/or pitch values are within the scopes of various embodiments. Further, although the impingement jets 156 of heated air exiting the exit holes 148 are schematically shown as being perpendicular to the bottom wall 146, other arrangements are within the scopes of various embodiments. For example, in at least one embodiment, one or more exit holes 148 are inclined with respect to the bottom wall 146 and cause the corresponding impingement jets 156 from such inclined exit holes 148 to exit the diffuser 128 in directions oblique to the bottom wall 146.

The described configuration of the diffuser 128 is an example. This example configuration is suitable, in at least one embodiment, for a simple, flat shape of a product to be formed from the set of components 110 on the tool 106. Other configurations of the diffuser 128 are within the scopes of various embodiments. For example, for a product to be formed that has a curved or complex shape dictated by a corresponding curved or complex shape of the tool 106, the shape of the diffuser 128, especially the bottom wall 146, and/or the arrangement, size, pitch, orientation etc., of the exit holes 148 are customizable to provide uniform heating to the set of components 110 on the tool 106. For example, in at least one embodiment, at least one exit hole 148 is oriented in a direction different from another exit hole 148 to direct the corresponding impingement jets 156 in different directions at different parts of the set of components 110 on the tool 106.

FIG. 4 is a schematic cross-section view similar to FIG. 1, and showing further elements in a closed state of the thermal processing and consolidation system 100 incorporating an air impingement device in accordance with some embodiments. As shown in FIG. 4, in one or more embodiments, a controller 402 is provided to monitor the temperature of the impinging air flow and/or to control operation of the blower 122 and/or the heaters 124 in accordance with various process parameters for thermally processing and consolidating the set of components 110. The controller 402 is coupled to the blower 122 and/or the heaters 124 and/or one or more temperature sensors 404 arranged at one or more points along the air flow path 130 and/or inside the plenum. For example, one or more temperature sensors 404 are arranged in the diffuser 128, and/or between the set of components 110 and a vacuum bag 406 (described in U.S. Pat. No. 8,650,745) that covers the set of components 110, and/or inside the set of components 110 for real time temperature monitoring and control during thermal processing and consolidation of the set of components 110. Other arrangements of temperature sensors are within the scopes of various embodiments. In at least one embodiment, the controller 402 includes one or more of microprocessors, micro-controllers, digital signal processors, microcomputers, central processing units, field programmable gate arrays, programmable logic devices, state machines, logic circuitry, analog circuitry, digital circuitry, and/or any device that manipulates signals (analog and/or digital), for example, based on operational instructions stored in one or more memory devices. Examples of such a memory device include, but are not limited to, read-only memory, random access memory, volatile memory, non-volatile memory, static memory, dynamic memory, flash memory, and/or any device that stores information. Examples of the temperature sensor(s) include, but are not limited to, thermocouples.

In at least one embodiment, the rate of flow of the blower 122 is adjustable by the controller 402. In a particular example, the rate of flow of the blower 122 is 100 CFM (cubic feet per minute) when the plenum is pressurized in the range of 80 psi-200 psi.

In at least one embodiment, the heating temperature and/or power and/or number of the heaters 124 is adjustable by the controller 402. For example, the controller 402 is configured to turn on or off one or more of the heaters 124 in response to a temperature reading from the temperature sensor(s). This arrangement is advantageous given the fact that the heated air, after impinging on the set of components 110, is mixed with and gradually warms up the air inside the plenum which is then circulated through the air flow path 130. As the air inside the plenum is warmed up, the temperature reading from the temperature sensor(s) increases. When the temperature reading from the temperature sensor(s) reaches a predetermined temperature, the controller 402 turns off one or more of the heaters 124 to keep the temperature of the impinging air flow at an intended value. In at least one embodiment, all heaters 124 are turned on at the beginning to quickly heat up the set of components 110, and then one or more of the heaters 124 is/are turned off to maintain the temperature of the impinging air flow at the intended value. The described temperature control by turning on/off one or more of the heaters 124 is an example. Other temperature control arrangements are within the scopes of various embodiments. For example, a dynamic and/or gradient control of the heating power of one or more of the heaters 124, e.g., by varying a voltage applied to one or more of the heaters 124, is usable in one or more embodiments. In a particular example, the temperature of the impinging air flow is heated up to 1200° F.

In one or more embodiments, the pressurized air is supplied to the plenum to pressurize the plenum for thermal processing and consolidation of the set of components 110 and/or to cool the set of components 110 after, or as part of, the thermal processing and consolidation. For example, the pressurized air is supplied to the plenum from a pressurized air source 412, which is also described herein with respect to the thermal processing and consolidation system 100 in FIG. 1, at the ambient air temperature. Other arrangements are within the scopes of various embodiments. For example, the pressurized air is preheated before being supplied to the plenum in at least one embodiment. In at least one embodiment, the pressurized air source 412 is coupled to the controller 402 to supply the pressurized air under control by the controller 402.

In one or more embodiments, the air impingement device 120 is configured to not only heat the set of components 110, but also to cool the set of components 110 (after the set of components 110 has been heated), depending on one or more considerations of the curing or forming process. In some embodiments, when the set of components 110 is to be cooled (after heating), the plenum remains closed and pressurized and the blower 122 continues to blow to generate an impinging air flow from the diffuser 128, but the air temperature of the impinging air flow is reduced to be cooler than the temperature of the heated set of components 110 to be cooled down. The impinging air flow can be cooled to a predetermined temperature using various methods, including, but not limited to, exchanging the air in the pressurized, closed plenum with cooler outside air, or actively cooling the air by directing the air through a heat exchanger for cooling.

In an example of passive cooling, the outside, cooler air is introduced, e.g., from the pressurized air source 412, into the closed plenum at a point 414 in the lower assembly 102. As a result, it is possible to move the cooler air right away into air flow path 130 for cooling down the set of components 110. In at least one embodiment, a controlled exhaust (not shown) is provided to exhaust air from the closed plenum to the outside, to keep the pressure in the closed plenum from increasing excessively due to the introduction of the outside, cooler air.

In an example of active cooling, the air impingement device 120 includes at least one heat exchanger 424 for cooling which is arranged in the lower assembly 102 along the air flow path 130, and is coupled to the controller 402. For example, in some embodiments, the air flow path 130 includes a further ducting 426 coupling an outlet of the blower 122 to the lower duct 134. The further ducting 426 supplies the forced air flow through the heaters 124 and/or the heat exchanger 424 which is arranged along the further ducting 426. In the heating operation, the heat exchanger 424 is turned off. In the cooling operation, the controller 402 turns off all the heaters 124 and turns on the heat exchanger 424, and the blower 122 circulates the plenum air through the heat exchanger which actively cools the circulating air down to an intended cooling temperature in accordance with the curing or forming process.

In one or more embodiments, one or more of the size, quantity and spacing (e.g., pitch p) of the exit holes 148 are engineered or configured to produce an impinging air flow with Reynolds number in the range of turbulent flow. By creating a turbulent air flow in the space between the diffuser 128 and the set of components 110, the intended heating/cooling rate and/or effectiveness and/or uniformity is/are achievable in at least one embodiment.

In one or more embodiments, the entirety of the air impingement device 120, e.g., the blower 122, the heaters 124, any heat exchanger 424 for cooling, the ducting 126, the diffuser 128, and any further ducting 426 are located within the pressurized volume or plenum of the thermal processing and consolidation system 100. Changes in air temperature and density affect the heating/cooling capacity of the impinging air, so it is imperative in at least one embodiment to consider the full range of the intended cure or forming process when tailoring all input parameters of the air impingement device 120.

Figure 5:
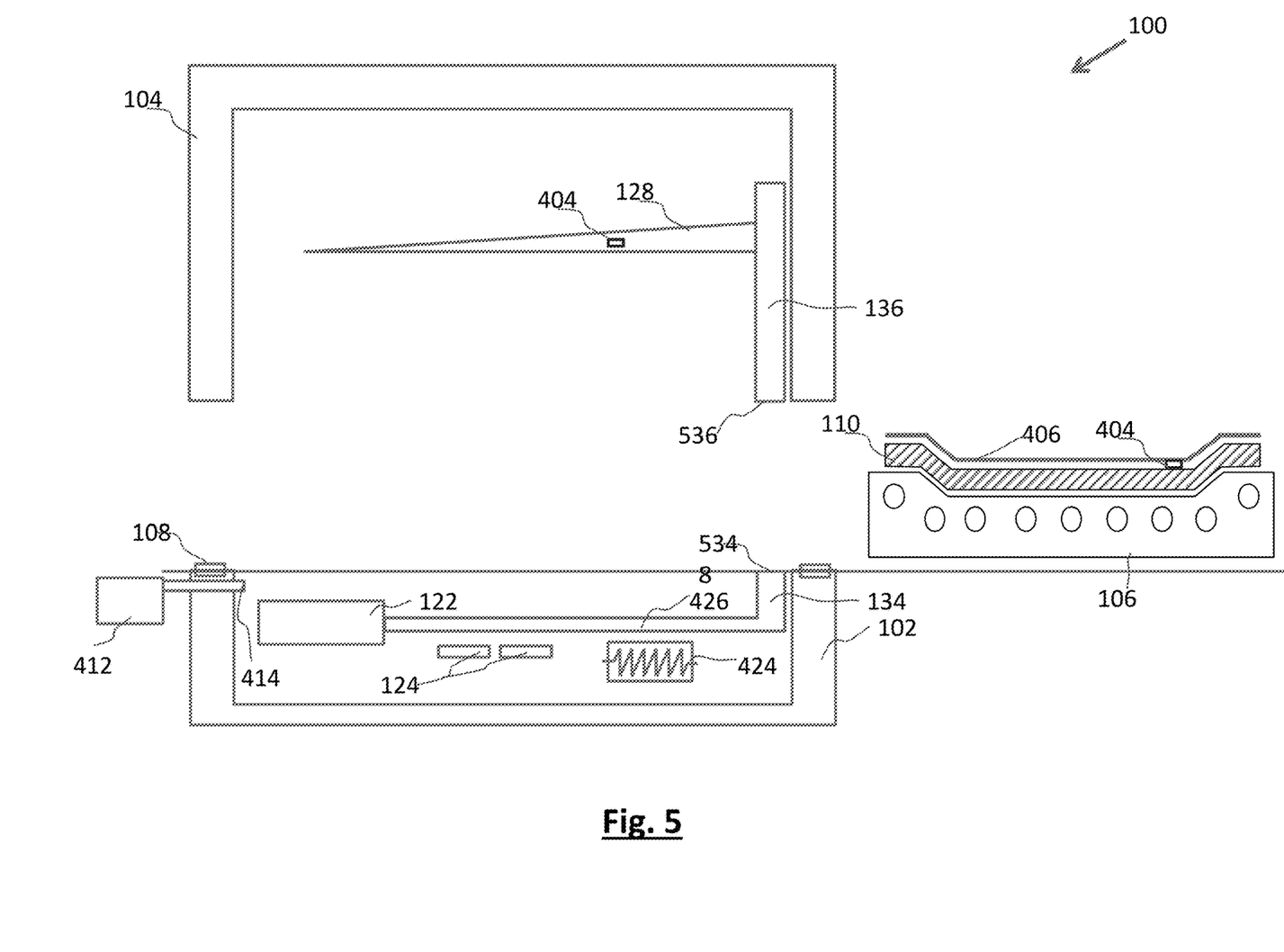
FIG. 5 is a schematic cross-section view similar to FIG. 4, and showing an opened state of the thermal processing and consolidation system incorporating an air impingement device in accordance with some embodiments.

FIG. 5 is a schematic cross-section view similar to FIG. 4, and showing an opened state of the thermal processing and consolidation system 100 incorporating an air impingement device in accordance with some embodiments. Several elements of the thermal processing and consolidation system 100 described with respect to FIG. 4 are omitted in FIG. 5 for simplicity. For example, in at least one embodiment, when the plenum is in the opened state as shown in FIG. 5, the lower duct 134 is vertically aligned with the upper assembly 104, so that simply by lowering the upper assembly 104 onto the lower assembly 102 to form the plenum, a lower open end 536 of the upper duct 136 is lowered onto, coupled and sealed with an upper open end 534 of the lower duct 134. Thus, the lower duct 134 is automatically connected and sealed with the upper duct 136 by movement of the upper assembly 104 toward the lower assembly 102. FIG. 5 shows a state where the set of components 110 is laid-up and/or bagged and/or sealed on the tool 106 before being placed in the plenum for thermal processing and consolidation. Alternatively, FIG. 5 shows a state where the set of components 110 and the tool 106 are removed from the plenum after the thermal processing and consolidation.

Figure 6:
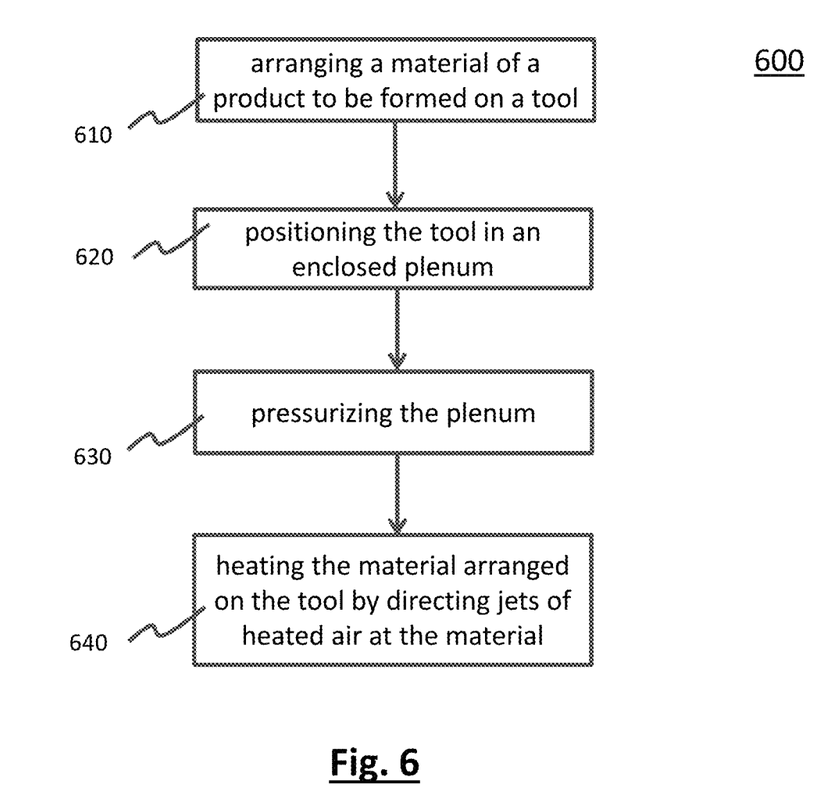
FIG. 6 is a flow chart of a thermally processing and consolidating method in accordance with some embodiments.

FIG. 6 is a flow chart of a thermally processing and consolidating method 600 in accordance with some embodiments.

At operation 610, a material of a product to be formed is arranged on a tool. In some embodiments, the material includes, but is not limited to, composite components, such as carbon fiber reinforced plastics, glass fiber reinforced plastics, or fiber reinforced composite (FRC) components. FRC components are useful in many industries, such as in the automotive, marine, military defense, aerospace, and medical equipment industries. In some embodiments, the product to be formed includes, but is not limited to, Class A FRC body panels or components. Examples of body panels and related parts include, but are not limited to, hoods, fenders, roofs, rockers, splitters, roof bows, dive planes, wings, mirror caps, deflectors, etc. Further examples of FRC components include, but are not limited to, deck-lids, battery applications, control arms, bumpers, sub-frames, and other structural components. Embodiments are not limited to forming any particular type of composite article, and such composite components can be of various sizes, shapes, and use. It is also to be appreciated that the embodiments are not limited to any particular industry.

In some embodiments, the operation 610 includes laying up, bagging and sealing a set of unprocessed components 110 in the tool 106 as described herein. In one or more embodiments, after the set of components 110 has been laid up within or on tool 106, the set of components 110 is bagged and/or covered and/or sealed with a vacuum bag 406 as described herein.

At operation 620, the tool with the material arranged thereon is positioned in an enclosed plenum. For example, the tool 106 with the set of components 110 laid-up and/or bagged and/or sealed thereon is positioned in the enclosed plenum formed by coupling the upper assembly 104 and the lower assembly 102, as described herein. In some embodiments, a push pull assembly (as described in U.S. Pat. No. 8,650,745) is coupled to the tool 106 and via a conveyer assembly to repositions tool 106 from a layup and demolding station (as shown in FIG. 5) to a location on the lower assembly 102 in alignment with upper assembly 104. A hydraulic press is used to couple and maintain pressure between the upper assembly 104 and lower assembly 102 to join the lower assembly 102 and the upper assembly 104 together to create the plenum. In some embodiments, the tool 106, with or without the set of components 110 thereon, is pre-heated outside the plenum and then the preheated tool 106 is positioned in the plenum, as described in U.S. patent application Ser. No. 14/754,086.

At operations 630 and 640, the material on the tool in the enclosed plenum is thermally processed and consolidated. For example, as described in U.S. Pat. No. 8,650,745, the tool 106 in the plenum is aligned and coupled to an automatic coupling system. The automatic coupling system is configured to provide a variety of services to the tool and the enclosed plenum. In some embodiments, the services include, but are not limited to, high pressure fluids or gases to pressurize the plenum about the tool 106. Vacuum is used in some embodiments to withdraw air or other gases from the set of components 110 to be thermally processed and consolidated at the tool 106. Thermal fluids, e.g., oils, is used in at least one embodiment to heat the tool 106, e.g., via ducts 430 in FIG. 4. Some embodiments use radiators, infrared panels, resistive heating panels or other heating systems to provide heat to thermal processing and consolidation of the set of components 110 within the tool 106. The set of components 110 at the tool 106 is thermally processed and consolidated according to a pressure and temperature profile maintained as a set of process parameters and executed by a controller, such as the controller 402.

As a part of the thermal processing and consolidation of the material on the tool, operation 630 in accordance with some embodiments includes pressurizing the plenum, for example, by the pressurized air from the pressurized air source 412, as described herein.

As a part of the thermal processing and consolidation of the material on the tool, operation 640 in accordance with some embodiments includes heating the material arranged on the tool by directing jets of heated air at the material. For example, jets 156 of heated air are directed from the diffuser 128 at the set of components 110 on the tool 106 to heat the set of components 110 as described herein. In at least one embodiment, the heating of the set of components 110 by the jets 156 of heated air is performed in conjunction with additional heating of the set of components 110 indirectly through the tool 106 which is heated by a heat source other than the jets 156 of heated air. For example, the tool 106 is heated by heated thermal fluids flowing in the ducts 430 as described herein, and the heated tool 106 indirectly heats the set of components 110 from below in addition to the heating of the set of components 110 from above by the jets 156 of heated air. One or more embodiments implementing this heating arrangement from both sides of the set of components 110 provide one or more advantages as described herein. In at least one embodiment, the heating of the set of components 110 by the jets 156 of heated air is performed without heating the tool 106 by a heat source other than the jets 156 of heated air.

In at least one embodiment as described herein, the pressurized air in the plenum is circulated by the blower 122 through one or more heaters 124, to generate a heated forced air flow which, after exiting the diffuser 128 as the jets 156 of heated air and impinging upon the set of components 110, is mixed with the pressurized air in the plenum to warm up the pressurized air inside the plenum and then the warmed-up pressurized air is circulated through the heaters 124 and the diffuser 128 again to be impinging upon the material. In at least one embodiment, after heating the set of components 110, the heated set of components 110 is cooled by directing jets 156 of cooled air, from the diffuser 128, at the heated set of components 110, as described herein.

Figure 7:
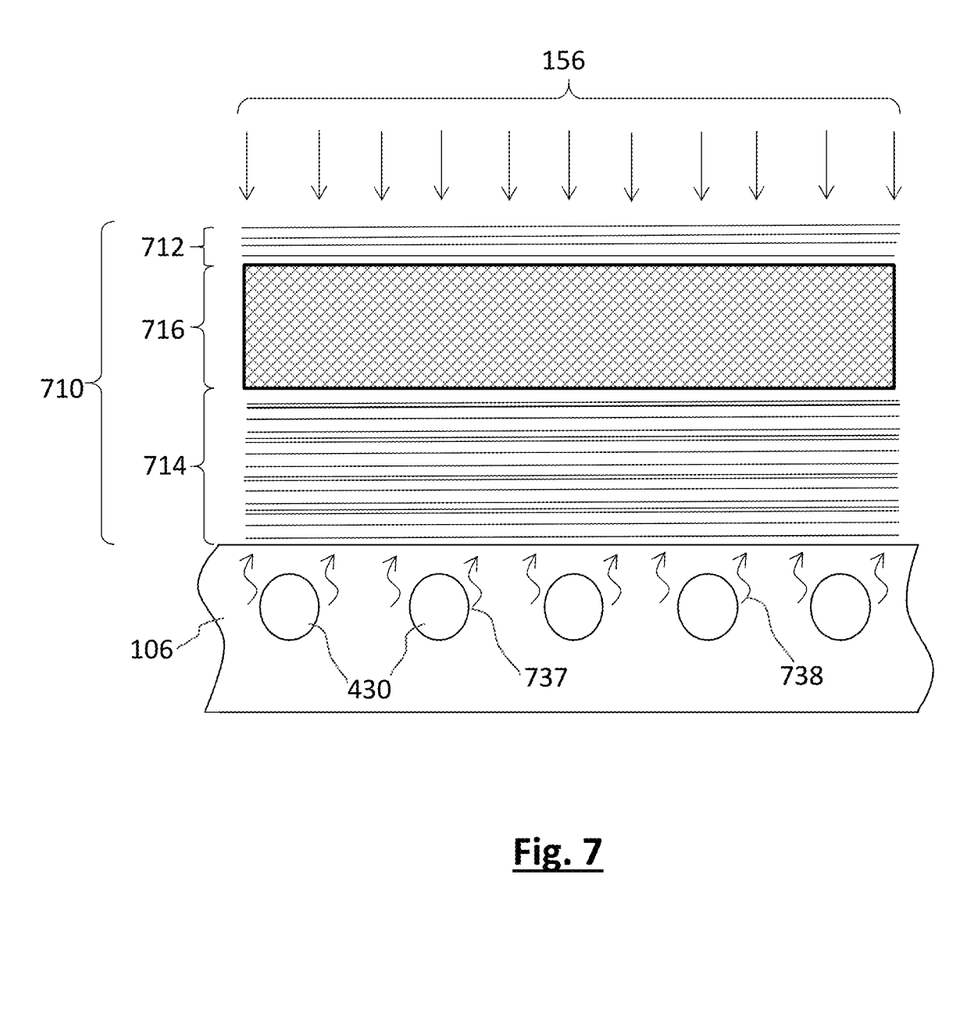
FIG. 7 is a schematic cross-sectional view of an example complex composite laminate to be thermally processed and consolidated in accordance with some embodiments.

FIG. 7 is a schematic cross-sectional view of an example complex composite laminate 710 to be thermally processed and consolidated in accordance with some embodiments. In at least one embodiment, the complex composite laminate 710 corresponds to the set of components 110 described herein, and is thermally processed and consolidated by the thermal processing and consolidation system 100 described herein. In the example configuration in FIG. 7, the complex composite laminate 710 includes a top face sheet 712, a bottom face sheet 714, and a core 716. The top face sheet 712 includes, for example, 4 plies of composite components. The bottom face sheet 714 is thicker than the top face sheet 712, and includes, for example, 16 plies of composite components. The core 716 is arranged between the top face sheet 712 and the bottom face sheet 714. In the example configuration in FIG. 7, the core 716 has a generally constant thickness and includes the same structure and/or material across the width of the complex composite laminate 710. Other configurations are within the scopes of various embodiments. For example, in some embodiments, the thermal processing and consolidation system 100 thermally processes and consolidates a complex composite laminate 710 where the core 716 includes a plurality of core parts having different thicknesses, and/or arranged at different heights in the complex composite laminate 710, and/or made of different core materials, and/or having different structures. The complex composite laminate 710 having the core 716 is referred to as a cored composite laminate.

The described configuration of the complex composite laminate 710 is an example, and other configurations are within the scopes of various embodiments. For example, the number of plies, materials of the plies, shapes and/or arrangement of the plies etc., in the top face sheet 712 and/or the bottom face sheet 714 are variable and/or selectable depending on one or more factors including, but not limited to, surface finish qualities, functionalities of the top face and/or the bottom face of the product to be formed. Examples of composite materials or components include, but are not limited to, thermosetting and/or thermoplastic matrix systems reinforced with carbon fiber, glass fiber or aramid fiber, surface finish systems, foils, decorative and ballistic laminate materials, metallic components etc. In at least one example configuration, the top face sheet 712 or the bottom face sheet 714 is omitted.

For another example, the number of core parts, materials of the core parts, shapes and/or arrangement of the core parts etc., in the core 716 are variable and/or selectable depending on one or more factors including, but not limited to, structural strength, functionalities etc., of the middle part of the product to be formed. In an example, the middle part of the product to be formed to ensure overall mechanical strength of the product to be formed. In such an example, the core 716 includes one or more core parts with materials and/or structures and/or arrangements so as to provide, after thermal processing and consolidation with the composite materials of the top face sheet 712 and/or the bottom face sheet 714. Examples of core parts include, but are not limited to, foam, honeycomb structures etc. In at least one example configuration, the core 716 is omitted entirely or partly.

In some embodiments, a complex composite laminate, such as the complex composite laminate 710, is co-cured in a single cycle. A single cycle, as described herein, includes laying up, vacuum bagging and sealing the complex composite laminate 710 in the tool 106, positioning the tool 106 in the enclosed plenum between the lower assembly 102 and the upper assembly 104, and supplying services to the plenum and/or the tool 106 for thermally processing and consolidating all composite components and/or core parts in the complex composite laminate 710 into a co-cured structure in which all composite components and/or core parts in the complex composite laminate 710 are cured and/or bonded together. In at least one embodiment, all components in the complex composite laminate 710 are uncured components which are all co-cured in a single cycle as described herein.

In at least one embodiment, co-curing of a complex composite laminate in a single cycle is possible by using an air impingement device, such as the air impingement device 120 described herein, either alone or in cooperation with other tool heating arrangement for heating the tool 106 as described herein. For example, for co-curing the complex composite laminate 710 in FIG. 7, the jets 156 of heated air are generated by the air impingement device 120 (not shown in FIG. 7) as described herein. In at least one embodiment, the diffuser 128 of the air impingement device 120 is configured to generate jets 156 of heated air in accordance with the complex configuration and/or shape of the complex composite laminate 710. A reason for this arrangement is that higher energy density is required to heat a thicker laminate than to heat a thinner laminate. The temperature and/or flow rate and/or velocity of jets 156 of heated air are controllable.

In the example configuration in FIG. 7, the temperature and/or heat amount in different regions are controllable, e.g., by the controller 402 controlling the temperature and/or amount of thermal fluids flowing through the corresponding ducts 430, in response to temperature readings provided by one or more temperature sensors 404 as described herein.

In the example configuration in FIG. 7, the bottom face sheet 714 is thicker than the top face sheet 712 and, therefore, the heating from below via the heating arrangement for the tool 106 is more aggressive, e.g., at a higher temperature, than the heating from above via the jets 156 of heated air. Other arrangements are within the scopes of various embodiments.

One or more of the following advantages is/are achievable in one or more embodiments.

As noted herein, some embodiments permit co-curing of complex composite laminates in a single cycle which is not achievable in other approaches. Specifically, as complexity of a particular composite laminate increases, other approaches design such a complex composite laminate as an assembly of simpler composite laminates. These simpler laminates are cured individually (e.g., by autoclaves) and the cured, simpler laminates are bonded or fastened into an assembly. Alternatively, in accordance with some other approaches, one or more simpler laminates is/are cured first, and then co-bonded to uncured components during additional cure cycles. Other approaches do not allow for composite laminates of a certain complexity to be co-cured during a single cycle.

To the contrary, some embodiments permit co-curing of complex composite laminates in a single cycle. The efficiency of a single-cycle co-cure process in accordance with at least one embodiment is not achievable in other approaches with multiple cure and assembly processes. Further, in other approaches, the composite laminate engineer is limited to simplifying his or her designs based on the traditional cure methodology which may lead to compromises in structural mechanical properties, mass reduction, acoustic performance and compromised design of inextricably linked proximate structure and systems. These disadvantages are avoidable in one or more embodiments where complex co-cure composite structures are achievable by using an air impingement device, either alone or in cooperation with other tool heating arrangements as described herein.

Air impingement heating, in one or more embodiments, enables improved heating rate and uniformity of heating for various types of materials including, but not limited to, simple flat, complex shape and cored composite parts. An impinging air jet flow pattern, specifically engineered for an application in at least one embodiment, provides a 4-time increase in the heat capacity of the air, as compared to simple convection methods. Combining air impingement heating within the highly efficient environment of a thermal processing and consolidation system as described in U.S. Pat. No. 8,650,745 enhances the ability to control heating rate and temperature, as well as the uniformity and specific target(s) of the heat in at least one embodiment. In some embodiments, air impingement is applicable to the tooling surface(s) (e.g., the upper surface of the tool 106) or composite (e.g., the set of components 110) and vacuum bag materials or a combination of both. The described air impingement heating method is not limited to composite material cure, and its use is anticipated, in one or more embodiments, for a variety of curing and forming processes within the process environment of a thermal processing and consolidation system as described in U.S. Pat. No. 8,650,745.

In some situations, a thermal processing and consolidation system as described in U.S. Pat. No. 8,650,745 is configured to rapidly heat and/or cool thin shell metallic tooling (e.g., the tool 106) and thin, monolithic composite laminates (e.g., the set of components 110) utilizing thermal fluid, induction or other integral temperature control methodology on one side (e.g., the bottom side) of the metallic tooling, especially when the thickness of the thin, monolithic composite laminates is not greater than 0.060 in. In some situations when the thickness of the monolithic composite laminates is at or greater than 0.060 in, effectiveness of heat transfer through such a thick polymer composite laminates and cored laminates is potentially limited in view of one or more process considerations. In such situations, it is particularly advantageous, in some embodiments, to combine air impingement heating (from above) with the thermal fluid, induction or other integral temperature control heated/cooled tooling methodology (from below) to improve performance and versatility of the thermal processing and consolidation system. Heating/cooling from both sides achieves the desired balanced heating/cooling effect, improving process rate and uniformity of temperature control in at least one embodiment. Although it is particularly effective to use air impingement heating/cooling for thick polymer composite laminates and cored laminates, it is possible to use air impingement heating/cooling for thin polymer composite laminates and cored laminates in at least one embodiment.

Other approaches of using simple air or Nitrogen convection systems do not have the heat capacity of jet impingement and are not well focused on the primary target; in an example, the composite laminate. In other approaches, energy is lost through heating of surrounding materials, and undesirable hot and cold spots are likely to form within the cure or forming environment as a result. Various radiation methods, e.g., IR, UV, radio, microwave, and induction, are applicable to a particular target medium, but typically require tuning to reach optimized levels or even specific susceptors in order to functionally heat the target medium.

Contrary to other approaches, in one or more embodiments, air impingement heating offers greater flexibility through the well-understood heat transfer properties of high velocity, directed air flow. The capacity of one or more embodiments to deliver heat via air impingement heating is controllable by one or more of, but not limited to, air velocity, air volume, diffuser hole size and pattern design, and control of the heating elements. The total efficiency of the thermal processing and consolidation system, including air impingement heating in accordance with some embodiments, embodies less energy than alternative cure systems, such as autoclaves.

One or more advantages or effects discussed herein with respect to heating using the air impingement device in accordance with some embodiments is/are applicable with respect to cooling using the air impingement device in accordance with some embodiments.

Figure 8:
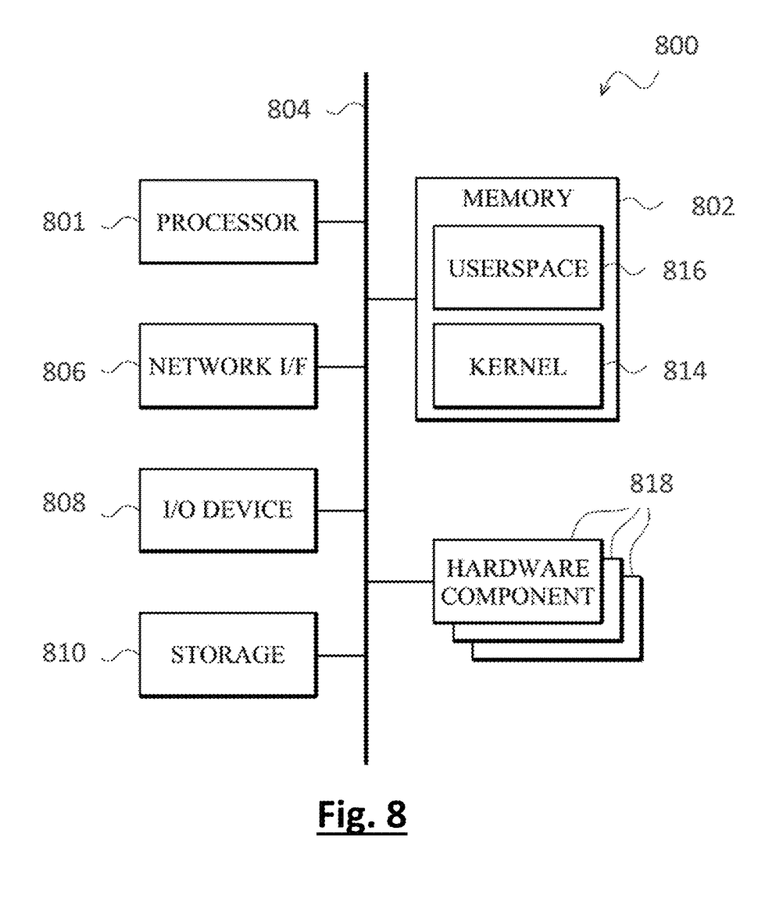
FIG. 8 is a block diagram of a computer system in accordance with some embodiments.

FIG. 8 is a block diagram of a computer system 800 in accordance with some embodiments. One or more of the functions and/or operations described with respect to FIGS. 1-7 (for example, those described with respect to the controller 402 in FIG. 4) is/are realized in some embodiments by one or more computer systems 800 of FIG. 8. The system 800 comprises at least one processor 801, a memory 802, a network interface (I/F) 806, a storage 810, an input/output (I/O) device 808 communicatively coupled via a bus 804 or other interconnection communication mechanism.

The memory 802 comprises, in some embodiments, a random access memory (RAM) and/or other dynamic storage device and/or read only memory (ROM) and/or other static storage device, coupled to the bus 804 for storing data and/or instructions to be executed by the processor 801, e.g., kernel 814, userspace 816, portions of the kernel and/or the userspace, and components thereof. The memory 802 is also used, in some embodiments, for storing temporary variables or other intermediate information during execution of instructions to be executed by the processor 801.

In some embodiments, a storage device 810, such as a magnetic disk or optical disk, is coupled to the bus 804 for storing data and/or instructions, e.g., kernel 814, userspace 816, etc. The I/O device 808 comprises an input device, an output device and/or a combined input/output device for enabling user interaction with the system 800. An input device comprises, for example, a keyboard, keypad, mouse, trackball, trackpad, and/or cursor direction keys for communicating information and commands to the processor 801. An output device comprises, for example, a display, a printer, a voice synthesizer, etc. for communicating information to a user.

In some embodiments, one or more of the functions and/or operations described with respect to FIGS. 1-7 (for example, those described with respect to the controller 402 in FIG. 4) is/are realized by the processor 801, which is programmed for performing such operations and/or functionality. In some embodiments, the processor 801 is configured as specifically configured hardware (e.g., one or more application specific integrated circuits (ASICs)). One or more of the memory 802, the I/F 806, the storage 810, the I/O device 808, the hardware components 818, and the bus 804 is/are operable to receive instructions, data, and/or other parameters for processing by the processor 801. The I/F 806, in one or more embodiments, includes one or more ports, connectors, cables, hardware modules for wireless communication and the like, for connection to and/or communication with one or more of the components of the thermal processing and consolidation system 100 described with respect to FIGS. 1-7.

In some embodiments, the operations and/or functionality are realized as functions of a program stored in a non-transitory computer readable recording medium. In at least one embodiment, the operations and/or functionality are realized as functions of a program, such as a set of executable instructions, stored in memory 802. Examples of a non-transitory computer readable recording medium include, but are not limited to, external/removable and/or internal/built-in storage or memory unit, e.g., one or more of an optical disk, such as a DVD, a magnetic disk, such as a hard disk, a semiconductor memory, such as a ROM, a RAM, a memory card, and the like.

In some embodiments, a thermal processing and consolidation system comprises an upper assembly, a lower assembly, and an air impingement device. At least one of the upper assembly or the lower assembly is a chamber assembly. The upper assembly and the lower assembly are movable relative to one another between an opened position where the upper assembly and the lower assembly are detached from one another, and a closed position where the upper assembly and the lower assembly are coupled to one another and form an enclosed plenum for receiving a tool. The air impingement device is arranged at least partially in the plenum, and configured to direct forced flows of air at the tool when the tool is received in the plenum.

In some embodiments, a thermally processing and consolidating method comprises arranging a material of a product to be formed on a tool, positioning the tool with the material arranged thereon in an enclosed plenum, and thermally processing and consolidating the material on the tool in the enclosed plenum. The thermally processing and consolidating comprise pressurizing the plenum, and heating the material arranged on the tool by directing jets of heated air at the material.

In some embodiments, in a thermal processing and consolidation system comprising upper and lower assemblies movable relative to one another and operable to form an enclosed plenum for receiving a tool, an air impingement device comprises a diffuser, a blower, at least one of a heater or a heat exchanger, and a ducting. The diffuser is configured to direct forced flows of air toward the tool received in the plenum for thermally processing and consolidating a material on the tool. The blower is configured to supply a forced air flow along an air flow path to the diffuser for causing the forced air flow to exit from the diffuser as the forced flows of air. The at least one heater or heat exchanger is arranged along the air flow path and configured to heat or cool, respectively, air in the forced air flow for heating or cooling, by way of the heated or cooled forced flows of air, the material on the tool. The ducting is arranged along the air flow path and connects an outlet the blower to the diffuser. The ducting comprises an upper duct coupled to the diffuser and configured to be attached to the upper assembly, and a lower duct coupled to the blower and configured to be arranged in the lower assembly. The lower duct is detachably connectable to the upper duct. The upper duct is disconnected from the lower duct in a first state corresponding to an opened position where the upper assembly and the lower assembly are detached from one another. The upper duct is connected and sealed with the lower duct in a second state corresponding a closed position where the upper assembly and the lower assembly are coupled to one another to form the plenum.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

The invention claimed is:

1. A thermal processing and consolidation system, comprising:
   an upper assembly;
   a lower assembly, at least one of the upper assembly or the lower assembly being a chamber assembly, the upper assembly and the lower assembly movable relative to one another between
      an opened position where the upper assembly and the lower assembly are detached from one another, and
      a closed position where the upper assembly and the lower assembly are coupled to one another and form an enclosed plenum for receiving a tool; and
   an air impingement device arranged at least partially in the plenum, and configured to direct forced flows of air at the tool when the tool is received in the plenum, wherein
   the air impingement device comprises a diffuser having
      a perforated wall including exit holes configured to face the tool when the tool is received in the plenum, and
      a closed wall arranged opposite and inclined with respect to the perforated wall, and
   the closed wall is configured to deflect a forced air flow toward the perforated wall and cause the deflected forced air flow to exit from the exit holes of the perforated wall as the forced flows of air, and the exit holes of the perforated wall are oriented to direct the forced flows of air toward the tool when the tool is received in the plenum.

2. The system of claim 1, further comprising the tool, wherein
   the tool comprises a surface configured to receive thereon a material of a product to be formed, the surface of the tool corresponding to a surface of the product, and when the tool is received in the plenum, the perforated wall is located between the closed wall and the surface of the tool along a direction in which the deflected forced air flow is caused to exit from the exit holes as the forced flows of air to impinge on the material on the surface of the tool.

3. The system of claim 1, wherein
the air impingement device further comprises air moving equipment configured to supply the forced air flow along an air flow path to the diffuser for causing the forced air flow to exit from the exit holes of the diffuser as the forced flows of air.

4. The system of claim 3, wherein
the air flow path circulates inside the plenum in the closed position of the upper and lower assemblies.

5. The system of claim 3, wherein
the air impingement device further comprises at least one of a heater or a heat exchanger arranged along the air flow path and configured to heat or cool, respectively, air in the forced air flow for heating or cooling, by way of the heated or cooled forced flows of air, a material of a product to be formed on the tool when the tool is received in the plenum.

6. The system of claim 5, wherein
the air impingement device further comprises
a temperature sensor arranged in the plenum, and
a controller coupled to the temperature sensor, the air moving equipment and the at least one heater or heat exchanger, and
the controller is configured to, in response to a temperature detected by the temperature sensor, control the air moving equipment and/or the at least one heater or heat exchanger to adjust a rate of flow and/or a temperature of the forced flows of air for heating or cooling the material on the tool in accordance with process parameters for thermally processing and consolidating the material.

7. The system of claim 1, wherein
the air impingement device further includes
a blower configured to supply the forced air flow along an air flow path to the diffuser for causing the forced air flow to exit from the diffuser as the forced flows of air toward the tool received in the plenum for thermally processing and consolidating a material on the tool;
at least one of a heater or a heat exchanger arranged along the air flow path and configured to heat or cool, respectively, air in the forced air flow for heating or cooling, by way of the heated or cooled forced flows of air, the material on the tool; and
a ducting arranged along the air flow path and connecting an outlet the blower to the diffuser, the ducting comprising
an upper duct coupled to the diffuser and configured to be attached to the upper assembly, and
a lower duct coupled to the blower and configured to be arranged in the lower assembly, the lower duct detachably connectable to the upper duct,
wherein
the upper duct is disconnected from the lower duct in a first state corresponding to an opened position where the upper assembly and the lower assembly are detached from one another, and
the upper duct is connected and sealed with the lower duct in a second state corresponding a closed position where the upper assembly and the lower assembly are coupled to one another to form the plenum.

8. The system of claim 7, wherein
the diffuser is adjustably attached to the upper duct at different heights to arrange the exit holes at different distances from the material on the tool.

9. The system of claim 1, wherein
the air impingement device further comprises
an upper duct attached to an inner wall of the upper assembly, and
a lower duct arranged in the lower assembly,
the diffuser is arranged in the upper assembly and is coupled to the upper duct to be in fluid communication with the upper duct,
the upper duct is disconnected from the lower duct in the opened position, and
by movement of the upper assembly toward the lower assembly from the opened position to the closed position, the upper duct is connected and sealed with the lower duct in the closed position for receiving the forced air flow from the lower duct and supplying the forced air flow to the diffuser.

10. The system of claim 9, wherein
the diffuser is adjustably attached to the upper duct at different heights to arrange the exit holes at different distances from the tool when the tool is received in the plenum.

11. The system of claim 10, wherein
the upper duct comprises a first window on a side facing the diffuser,
the diffuser comprises a second window on a side facing the upper duct, and in fluid communication with the first window of the upper duct, and
one of the first and second windows is larger than the other to permit adjustable attachment of the diffuser to the upper duct at different heights, while maintaining fluid communication between the diffuser and the upper duct.

12. The system of claim 1, wherein the exit holes of the perforated wall point downward toward the tool when the tool is received in the plenum.

13. A thermal processing and consolidation system, comprising:
an upper assembly;
a lower assembly, at least one of the upper assembly or the lower assembly being a chamber assembly, the upper assembly and the lower assembly movable relative to one another between
an opened position where the upper assembly and the lower assembly are detached from one another, and
a closed position where the upper assembly and the lower assembly are coupled to one another and form an enclosed plenum for receiving a tool; and
an air impingement device arranged at least partially in the plenum, and configured to direct forced flows of air at the tool when the tool is received in the plenum,
wherein
the air impingement device comprises a diffuser having exit holes configured to direct the forced flows of air exiting from the exit holes toward the tool when the tool is received in the plenum,
the air impingement device further comprises
an upper duct attached to an inner wall of the upper assembly, and
a lower duct arranged in the lower assembly,
the diffuser is arranged in the upper assembly and is coupled to the upper duct to be in fluid communication with the upper duct, the upper duct is disconnected from the lower duct in the opened position, and by movement of the upper assembly toward the lower assembly from the opened position to the closed position, the upper duct is connected and sealed with the lower duct in the closed position for receiving a forced air flow from the lower duct and supplying the forced air flow to the diffuser.

14. The system of claim 13, wherein the diffuser is adjustably attached to the upper duct at different heights to arrange the exit holes at different distances from the tool when the tool is received in the plenum.

15. The system of claim 14, wherein the upper duct comprises a first window on a side facing the diffuser, the diffuser comprises a second window on a side facing the upper duct, and in fluid communication with the first window of the upper duct, and one of the first and second windows is larger than the other to permit adjustable attachment of the diffuser to the upper duct at different heights, while maintaining fluid communication between the diffuser and the upper duct.

16. A thermally processing and consolidating method, comprising:

arranging a material of a product to be formed on a tool;

positioning the tool with the material arranged thereon in an enclosed plenum; and thermally processing and consolidating the material on the tool in the enclosed plenum by pressurizing the plenum, and heating the material arranged on the tool by directing jets of heated air at the material, wherein the enclosed plenum is formed by an upper assembly and a lower assembly coupled to the upper assembly at a closed position, the upper assembly and lower assembly are movable relative to one another between an opened position where the upper assembly and the lower assembly are detached from one another, and the closed position, at least one of the upper assembly or the lower assembly is a chamber assembly, the jets of heated air are directed, by an air impingement device arranged at least partially in the plenum, at the tool in the enclosed plenum, the air impingement device includes a diffuser having a perforated wall facing the tool in the enclosed plenum and having exit holes, and a closed wall arranged opposite and inclined with respect to the perforated wall, the closed wall deflects a forced air flow toward the perforated wall and causes the deflected forced air flow to exit from the exit holes of the perforated wall as the forced flows of air, and the exit holes of the perforated wall are oriented to direct the forced flows of air exiting from the exit holes as the jets of heated air toward the tool in the enclosed plenum.

17. The method of claim 16, wherein said thermally processing and consolidating further comprise heating the material indirectly through the tool which is heated by a heat source other than the jets of heated air.

18. The method of claim 17, wherein the material of the product to be formed includes a complex composite laminate components of which are co-cured by said thermally processing and consolidating.

19. The method of claim 16, further comprising:

arranging the diffuser facing the material on the tool, and supplying a heated forced air flow to the diffuser which causes the heated forced air flow to exit from the diffuser as the jets of heated air, wherein the jets of heated air create a turbulent air flow in a space between the diffuser and the material on the tool.

20. The method of claim 16, further comprising:

arranging the diffuser facing the material on the tool, and supplying a heated forced air flow to the diffuser which causes the heated forced air flow to exit from the diffuser as the jets of heated air, wherein in said pressurizing, the plenum is pressurized by air, said supplying comprises circulating the pressurized air in the plenum through a heater to generate the heated forced air flow which, after exiting the diffuser as the jets of heated air and impinging upon the material, is mixed with the pressurized air in the plenum to warm up the pressurized air inside the plenum and then the warmed-up pressurized air is circulated through the heater and the diffuser again to be impinging upon the material, and the method further comprises:

after said heating, cooling the material by directing jets of cooled air, from the diffuser, at the material which has been pressurized and heated.

\* \* \* \* \*